UNITED STATES PATENT OFFICE.

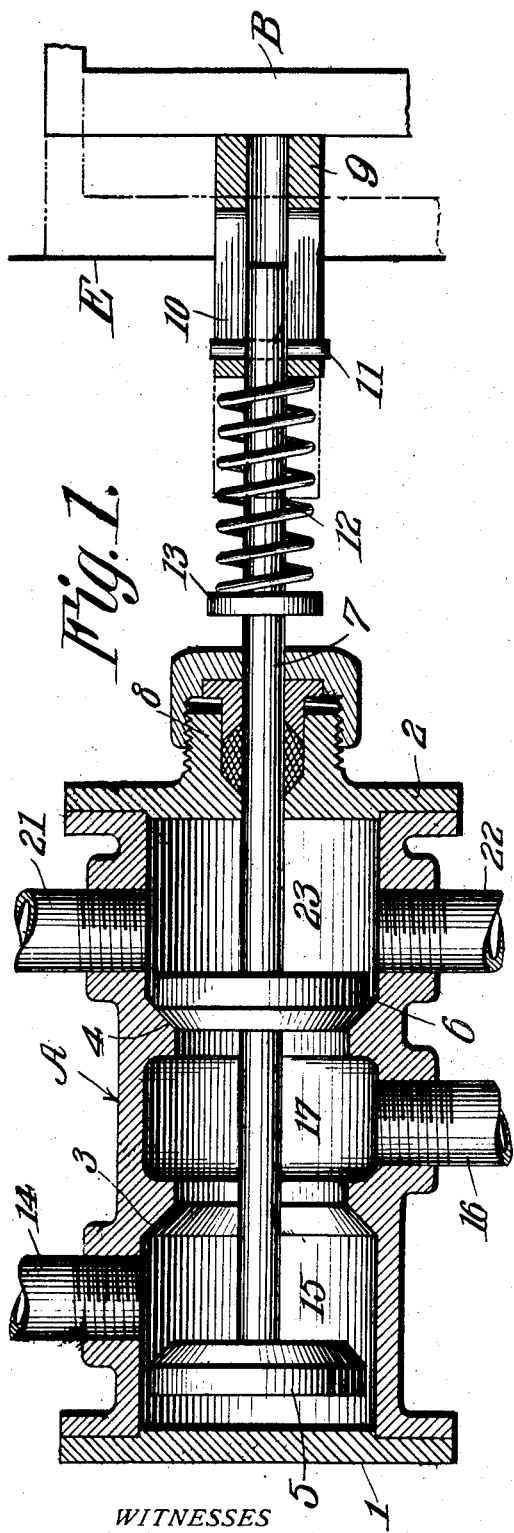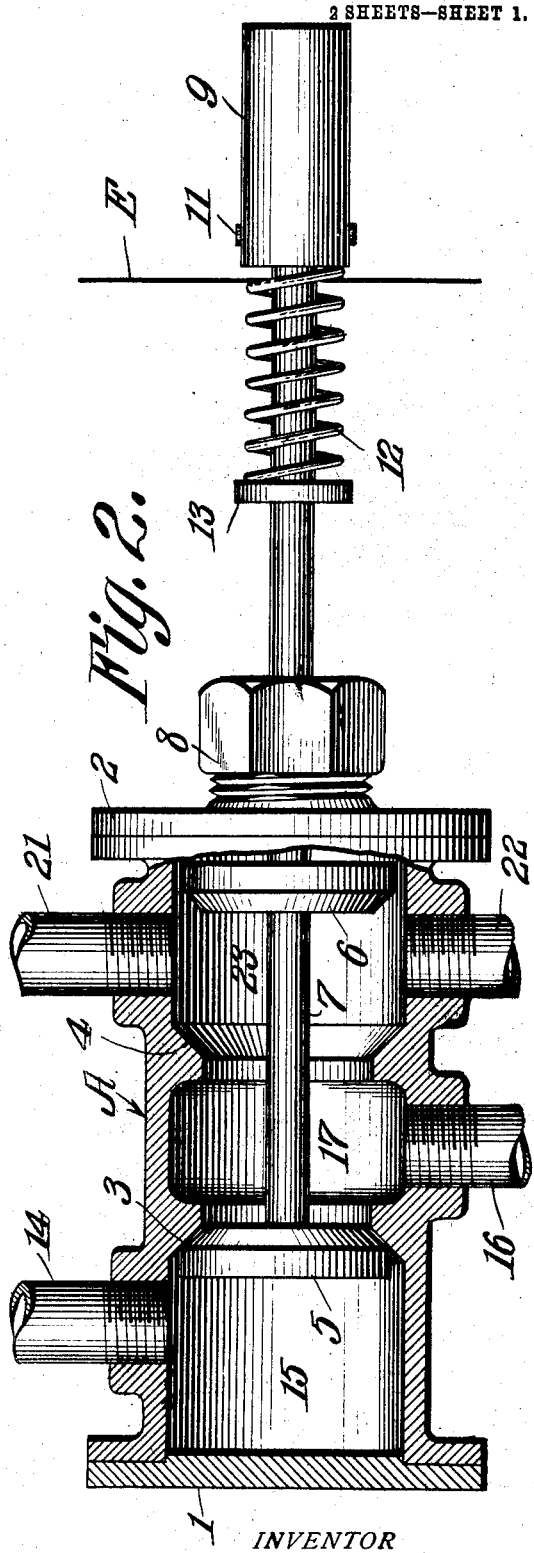

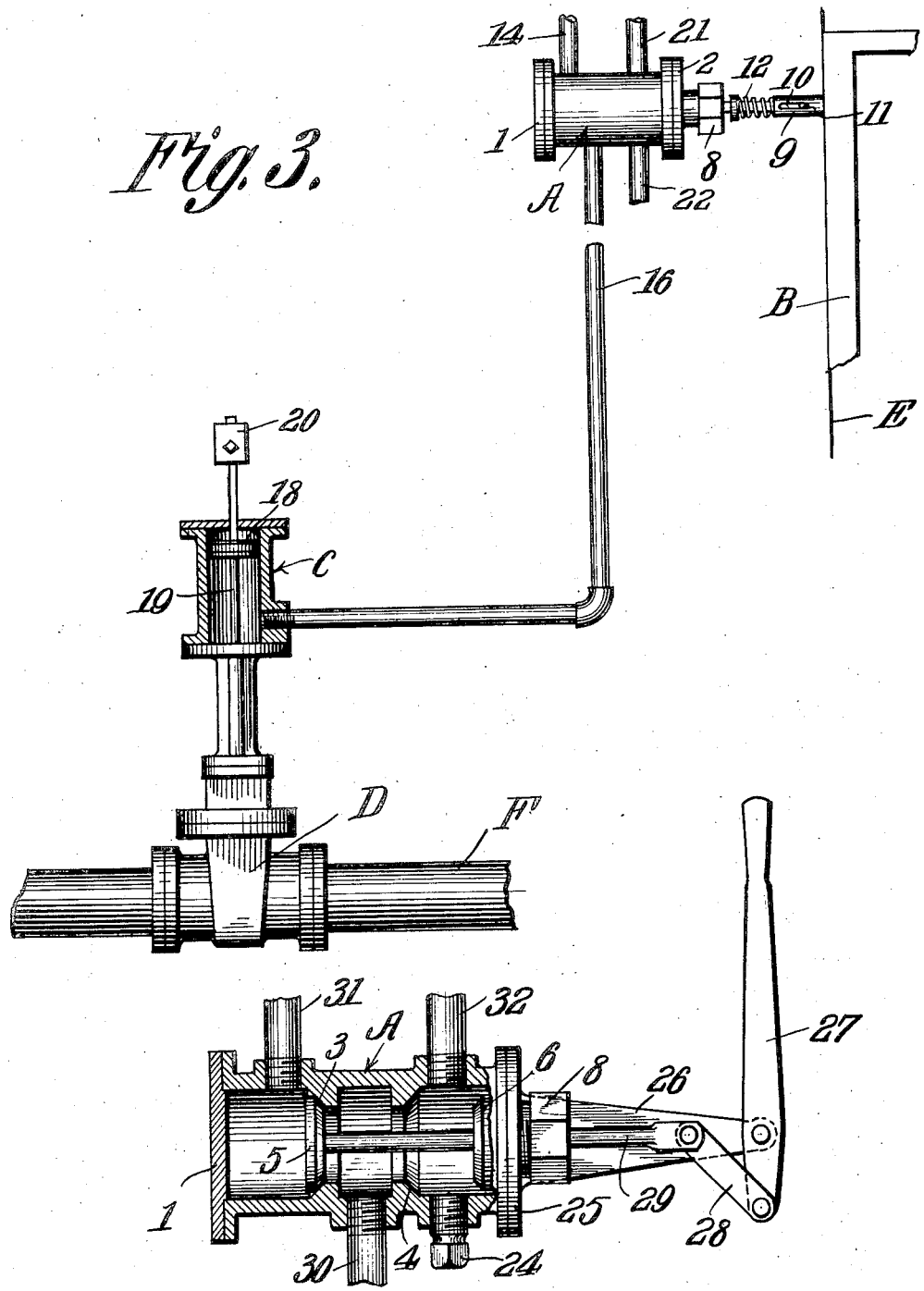

LOUIS J. MILKE, OF BALTIMORE, MARYLAND.

VALVE.

No. 922,017.    Specification of Letters Patent.    Patented May 18, 1909.

Application filed November 10, 1908. Serial No. 461,947.

*To all whom it may concern:*

Be it known that I, LOUIS J. MILKE, a citizen of the United States, residing at Baltimore city, State of Maryland, have invented certain new and useful Improvements in Valves, of which the following is a specification.

My invention relates to an improvement in valves, and more particularly to valves of the character now about to be described, wherein the valve, by reason of its construction, is automatically made to open by the fluid pressure flowing through it after the controlling means by which the valve is made to close, is released, and is particularly adapted to automatic control devices for elevators and the like as referred to in the accompanying drawings, forming a part of this specification, in which—

Figure 1 is a longitudinal sectional view of a valve constructed in accordance with the present invention, the same being shown in the open or operative position. Fig. 2, is a similar view, with the valve in the opposite position to that shown in Fig. 1. Fig. 3, is an elevation, partly in section, showing the valve applied. Fig. 4, is a modified form of valve, the same being shown in sectional elevation.

In the drawing, A represents a valve body or casing, provided with end caps 1 and 2, valve seats 3 and 4 are provided within the casing against which the valves 5 and 6 respectively are adapted to become seated. Mounted on a stem 7, one end of which projects through the end cap 2, said cap being provided with a stuffing box 8, slidably mounted on the end of the valve stem 7, is a sleeve 9 provided with a longitudinal slot 10, a pin 11 is fixed to the stem 7 and projects through the slot 10, thereby limiting the movement of the sleeve 9. A spring 12 surrounds the stem and is interposed between the sleeve 9 and a collar 13 formed integral with or otherwise fixed to the stem. The sleeve, together with a spring just described, serves as means for producing positive seating of the valve, when the sleeve is engaged by a door B. An inlet pipe 14 is screw threaded to the body A and establishes communication from a source of fluid pressure (not shown) to a chamber 15 at one end of the valve body. A pipe 16, also screw threaded to the valve body, connects a chamber 17, approximately midway of the valve body, with the chamber 15 on the next succeeding valve, when the said valves are placed in series, should the particular valve under consideration be the last in series, then the pipe 16 is connected to a cylinder C, said cylinder being provided with a piston 18 secured to a stem 19, the lower end of which is secured to the gate of a valve D located on the pipe line F, through which a fluid pressure flows by which an elevator is operated, the valve D serving to cut off the flow as will be hereinafter explained. Above the piston 18, the stem projects through the head of the cylinder and has attached thereto a weight 20, the purpose of which will hereinafter appear.

A pipe 21 is threaded to the valve casing and communicates with a pipe 22, also threaded to the valve body, through a chamber 23. In a series of valves the pipe 22 on the last valve leads to a point of discharge.

Operation is as follows: Referring to the drawings, let it be assumed the valve A in Fig. 3 is in the position shown in Fig. 1, the door B has seated the valve 6 and is about to be closed against the door casing E. Pressure will now flow from pipe 14 through chamber 15 into chamber 17, thence through pipe 16 to the cylinder C, where it enters below the piston 18 and forces same upwardly, opening the gate valve D.

When a door B is opened, the pressure against the face of the valve 5 causes the valve to close and at the same time the valve 6 is opened, thereby relieving pressure from the under side of the piston 18, the weight 20 will cause piston to descend, thus closing the gate valve and backing the water through the pipe 16, chamber 17 and chamber 23 into the drain pipe 22 to discharge.

In Fig. 4 is shown the valve as used for a three-way valve in which case the pipe 22 is removed and a plug 24 is applied to the opening. A cap 25 provided with a bracket 26 is substituted for the cap 2. Pivotally secured to the end of the said bracket 26 is a lever 27, to the short end of which is pivotally connected one end of a link 28, to the other end of said link is pivoted the valve stem 29; pipe 30 now becomes the inlet and pipes 31 and 32 outlet pipes.

Slight changes and alterations might be resorted to in the form and arrangement of the several parts described, without departing from the spirit and scope of my invention, and hence I do not wish to limit myself to the exact construction as herein set forth; but—

Having fully described my invention, what I claim as new and desire to secure by Letters Patent, is:—

1. A valve, comprising a casing, a valve stem, a pair of valves carried thereby, a sleeve slidably secured on the said valve stem, means limiting the movement of the sleeve, a collar provided on the said stem, a spring surrounding the said stem and interposed between the said sleeve and collar, substantially as described.

2. A valve, comprising a casing having a plurality of inlet and exhaust ports provided therein, a reciprocating valve stem, a plurality of valves carried thereby, a chamber within the casing interposed between the said valves, a plurality of valve seats formed within the said casing, a sleeve slidably secured on the said valve stem, means limiting the reciprocation of the sleeve, a collar provided on the said valve stem, a spring surrounding the said stem and interposed between the said sleeve and collar, substantially as described.

3. A valve, comprising a casing, having a plurality of chambers, and a plurality of inlet and outlet ports provided therein, a reciprocating valve stem, a plurality of valves carried thereby, a plurality of valve seats formed within the said casing, a sleeve slidably secured on the said valve stem, means for limiting the movement of the sleeve, a collar provided on the said valve stem, a spring surrounding the said stem and interposed between the said sleeve and collar, substantially as described.

4. A valve, comprising a casing, having a plurality of chambers formed therein, an inlet pipe discharging into one of the said chambers, outlet pipes leading from the other chambers, a reciprocating valve stem, valves carried thereby, valve seats formed within the said casing, a sleeve slidably secured on the said valve stem, means limiting the movement of the said sleeve, a collar provided on the said valve stem, a spring surrounding the said stem and interposed between the said sleeve and collar, substantially as described.

5. A valve, comprising a casing, having a plurality of chambers formed therein, caps secured on each end of the said casing, a stuffing box provided in one of the said caps, a reciprocating valve stem secured within the casing, valves carried thereby, valve seats formed within the said casing, a sleeve slidably secured on the said stem exterior of the said casing, means limiting the movement of the sleeve, a collar provided on the said valve stem, a spring surrounding the said valve stem and interposed between the said sleeve and collar, and means for reciprocating the said valve stem, thereby opening and closing the said valves, substantially as described.

In testimony whereof I affix my signature in presence of two witnesses.

LOUIS J. MILKE.

Witnesses:
E. WALTON BREWINGTON,
LIZZIE S. BARRON.